US012332739B2

(12) United States Patent
McCall et al.

(10) Patent No.: US 12,332,739 B2
(45) Date of Patent: *Jun. 17, 2025

(54) BUFFER THAT SUPPORTS BURST TRANSFERS HAVING PARALLEL CRC AND DATA TRANSMISSIONS

(71) Applicant: Intel Corporation, Santa Clara, CA (US)

(72) Inventors: James A. McCall, Portland, OR (US); Bill Nale, Livermore, CA (US); Zibing Yang, Hudson, MA (US); Yanjie Zhu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 829 days.

This patent is subject to a terminal disclaimer.

(21) Appl. No.: 17/327,432

(22) Filed: May 21, 2021

(65) Prior Publication Data

US 2021/0279128 A1 Sep. 9, 2021

(51) Int. Cl.
*G06F 11/10* (2006.01)
*G06F 11/07* (2006.01)
*G06F 11/30* (2006.01)

(52) U.S. Cl.
CPC ...... *G06F 11/1004* (2013.01); *G06F 11/0772* (2013.01); *G06F 11/1068* (2013.01); *G06F 11/3037* (2013.01); *G06F 11/3041* (2013.01)

(58) Field of Classification Search
CPC ............ G06F 11/1004; G06F 11/0772; G06F 11/1068; G06F 11/3037; G06F 11/3041
USPC ....................................................... 714/758
See application file for complete search history.

(56) References Cited

U.S. PATENT DOCUMENTS

| 6,701,478 B1 * | 3/2004 | Yang | H03M 13/091 714/776 |
| 8,918,706 B1 * | 12/2014 | Lewis | H03M 13/6561 714/781 |
| 2007/0006057 A1 * | 1/2007 | Wallner | G11C 7/1006 714/763 |
| 2008/0168325 A1 * | 7/2008 | Yoon | G06F 11/1004 714/E11.053 |
| 2010/0211834 A1 * | 8/2010 | Asnaashari | G06F 11/1004 714/763 |
| 2011/0246857 A1 * | 10/2011 | Bae | G06F 11/1004 714/763 |
| 2013/0061102 A1 * | 3/2013 | Sohn | G11C 7/1063 714/718 |
| 2014/0282753 A1 * | 9/2014 | Li | H04N 21/43637 725/81 |
| 2019/0042095 A1 * | 2/2019 | Vergis | G06F 3/0658 |
| 2019/0158126 A1 * | 5/2019 | Carlough | H04L 1/0041 |

(Continued)

*Primary Examiner* — Albert Decady
*Assistant Examiner* — Osman M Alshack
(74) *Attorney, Agent, or Firm* — Compass IP Law PC

(57) ABSTRACT

A method is described. The method includes a buffer semiconductor chip receiving a plurality of data signals. The method includes the buffer chip calculating first CRC information from the plurality of data signals. The method includes the buffer chip transmitting the plurality of data signals in parallel with the first CRC information if a read burst transfer sequence is being performed, the buffer chip receiving second CRC information in parallel with the plurality of data signals and comparing the first CRC information with the second CRC information if a write burst transfer sequence is being performed.

18 Claims, 11 Drawing Sheets

Four

(56) References Cited

U.S. PATENT DOCUMENTS

2020/0066701 A1* 2/2020 Guo .................. H01L 24/97
2020/0382236 A1* 12/2020 Lee .................. H04L 1/0045
2021/0075441 A1* 3/2021 Miyamoto ........ H03M 13/6561

* cited by examiner

| | Transfer cycles | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| DQ0 | d0 | d4 | d8 | d12 | d16 | d20 | d24 | d28 | d32 | d36 | d40 | d44 | d48 | d52 | d56 | d60 | CRC0 | CRC4 |
| DQ1 | d1 | d5 | d9 | d13 | d17 | d21 | d25 | d29 | d33 | d37 | d41 | d45 | d49 | d53 | d57 | d61 | CRC1 | CRC5 |
| DQ2 | d2 | d6 | d10 | d14 | d18 | d22 | d26 | d30 | d34 | d38 | d42 | d46 | d50 | d54 | d58 | d62 | CRC2 | CRC6 |
| DQ3 | d3 | d7 | d11 | d15 | d19 | d23 | d27 | d31 | d35 | d39 | d43 | d47 | d51 | d55 | d59 | d63 | CRC3 | CRC7 |

Fig. 3
(prior art)

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | | | | | | | | Transfer cycles | | | | | | | | |
| DWx | d0 | d4 | d8 | d12 | d16 | d20 | d24 | d28 | d32 | d36 | d40 | d44 | d48 | d52 | d56 | d60 |
| DXx | d1 | d5 | d9 | d13 | d17 | d21 | d25 | d29 | d33 | d37 | d41 | d45 | d49 | d53 | d57 | d61 |
| DYx | d2 | d6 | d10 | d14 | d18 | d22 | d26 | d30 | d34 | d38 | d42 | d46 | d50 | d54 | d58 | d62 |
| DZx | d3 | d7 | d11 | d15 | d19 | d23 | d27 | d31 | d35 | d39 | d43 | d47 | d51 | d55 | d59 | d63 |
| CRC_x | 0 | 1 | 2 | 3 | 4 | 5 | 6 | 7 | 8 | 9 | 10 | 11 | 12 | 13 | 14 | 15 |

Fig. 6

| Pin | Transfer cycles | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Data | | | | | | | | | | | | | | | | |
| DW1 | 0 | 1 | 2 | 3 | 4 | 5 | 6 | 7 | 8 | 9 | 10 | 11 | 12 | 13 | 14 | 15 |
| DX1 | 16 | 17 | 18 | 19 | 20 | 21 | 22 | 23 | 24 | 25 | 26 | 27 | 28 | 29 | 30 | 31 |
| DY1 | 32 | 33 | 34 | 35 | 36 | 37 | 38 | 39 | 40 | 41 | 42 | 43 | 44 | 45 | 46 | 47 |
| DZ1 | 48 | 49 | 50 | 51 | 52 | 53 | 54 | 55 | 56 | 57 | 58 | 59 | 60 | 61 | 62 | 63 |
| DW2 | 64 | 65 | 66 | 67 | 68 | 69 | 70 | 71 | 72 | 73 | 74 | 75 | 76 | 77 | 78 | 79 |
| DX2 | 80 | 81 | 82 | 83 | 84 | 85 | 86 | 87 | 88 | 89 | 90 | 91 | 92 | 93 | 94 | 95 |
| DY2 | 96 | 97 | 98 | 99 | 100 | 101 | 102 | 103 | 104 | 105 | 106 | 107 | 108 | 109 | 110 | 111 |
| DZ2 | 112 | 113 | 114 | 115 | 116 | 117 | 118 | 119 | 120 | 121 | 122 | 123 | 124 | 125 | 126 | 127 |
| CRC | | | | | | | | | | | | | | | | |
| CRC_1 | 0 | 1 | 2 | 3 | 4 | 5 | 6 | 7 | 8 | 9 | 10 | 11 | 12 | 13 | 14 | 15 |

Fig. 7

BUFFER THAT SUPPORTS BURST TRANSFERS HAVING PARALLEL CRC AND DATA TRANSMISSIONS

FIELD OF INVENTION

The field of invention pertains to the computing sciences generally, and, more specifically, to a buffer that supports burst transfers having parallel CRC and data transmissions.

BACKGROUND

Figure 1:
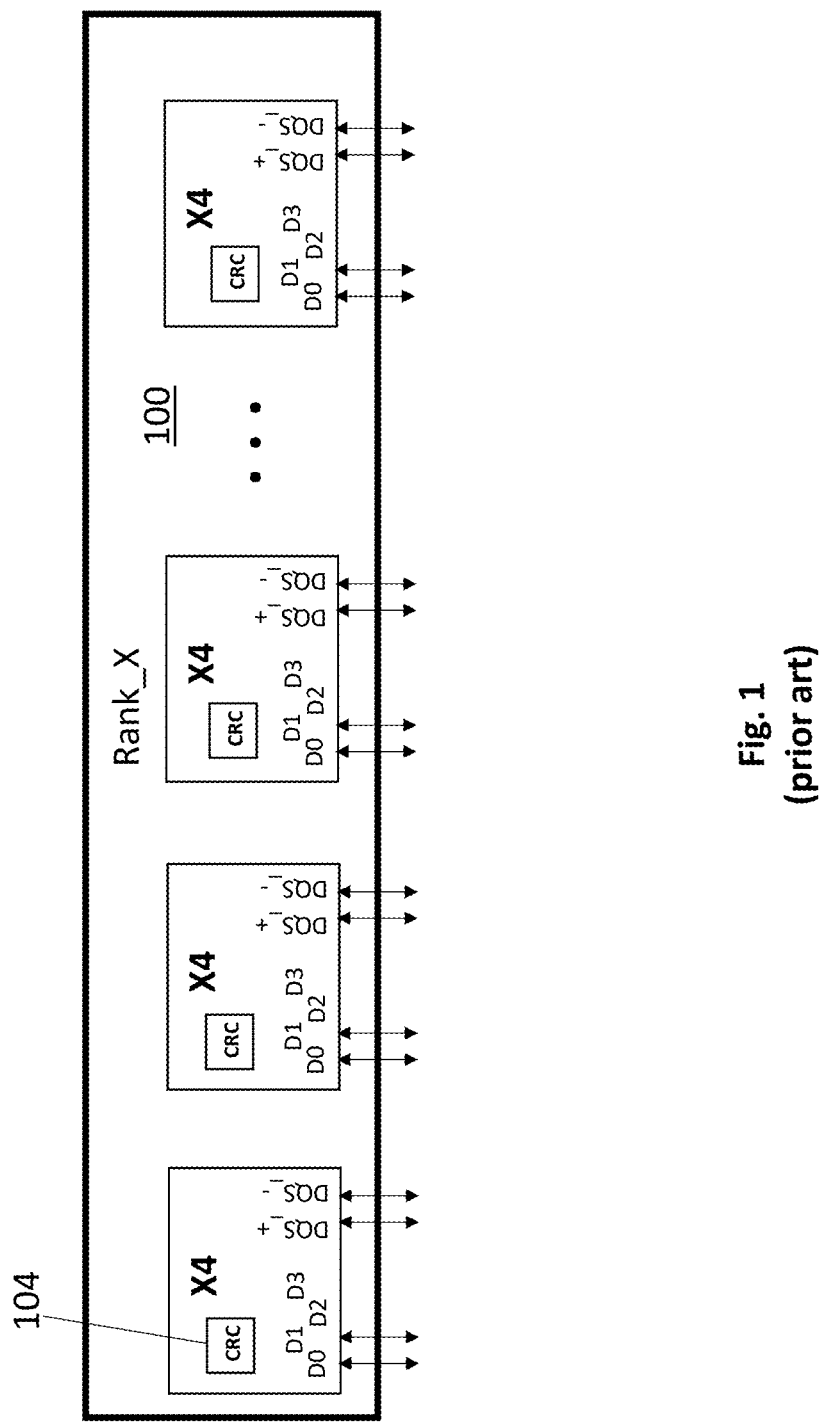

FIG. 1 shows a traditional memory rank 100 implemented with X4 memory chips. Each memory chip includes four data pins (D0-D3) and two data strobe pins (DQS_+, DQS_−). Per X4 memory chip, the data strobe pins propagate a differential data strobe signal that clocks data in and/or out of the memory chip's four data pins. The number of memory chips corresponds to the width of the data bus being implemented. For example, ten X4 memory chips are used to implement and memory rank for a memory bus having a width of 32 bits of data and 8 bits of Error Correction Code (ECC) (((32+8)/4)=10).

Figure 2:
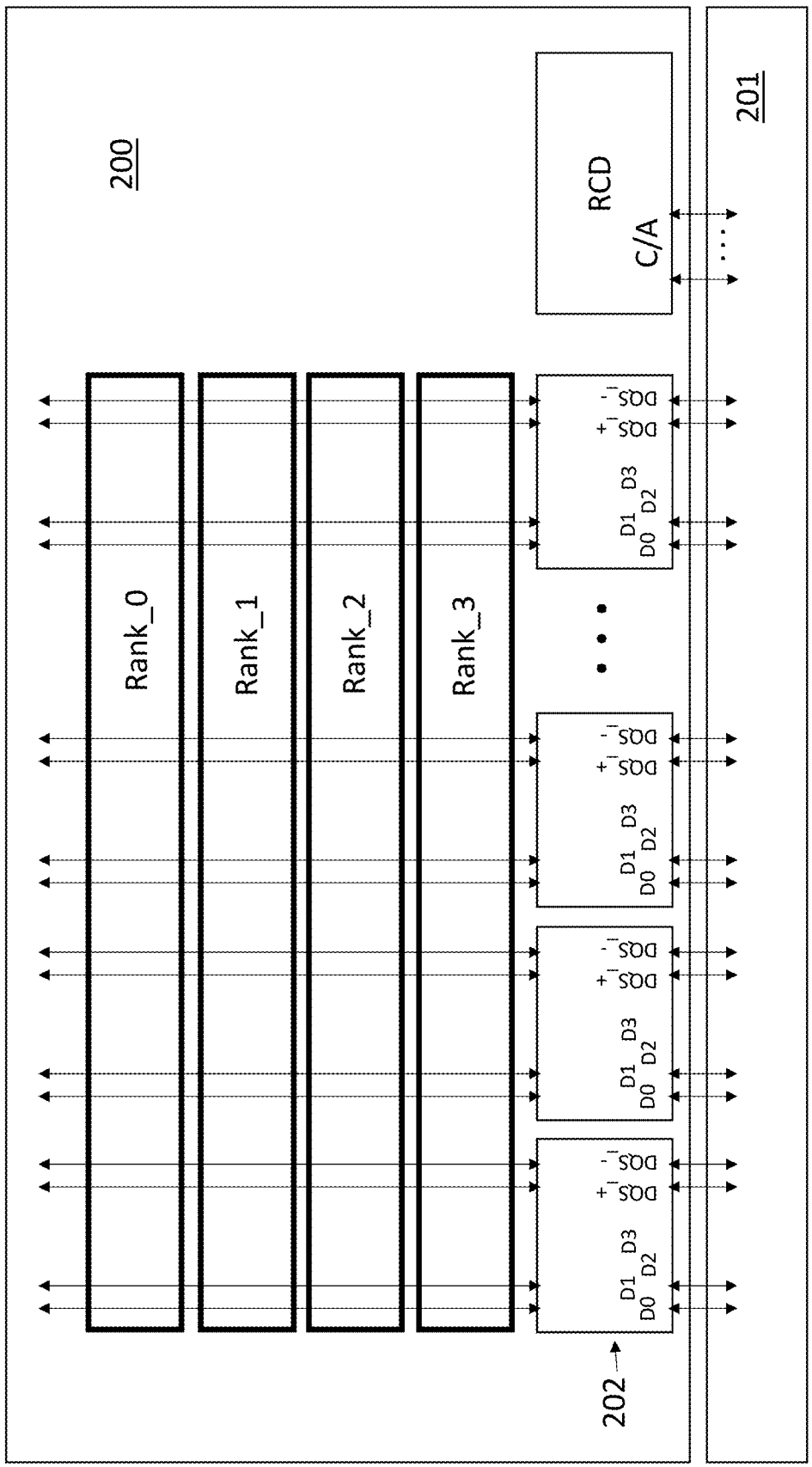

FIG. 2 shows a prior art memory module 200 having multiple ranks of memory chips. The memory module is coupled to a memory channel disposed on a motherboard 201. The data and strobe wires of the motherboard's memory channel are coupled to a bank of buffer chips 202 on the module 200. Between the buffer chips and the ranks on the module 200, the data and strobe wires are fanned out to each of the ranks.

From the perspective of a host on the motherboard 201 that is coupled to the memory bus (e.g., a memory controller, not shown in FIG. 2 for ease of illustration), the buffer chips 202 provide a single load per memory bus wire even though multiple ranks of memory chips exist on the module 200. During a memory access transaction between the host and the module 200, only the memory chips of the rank targeted by the transaction are activated to perform the transaction's read or write operation.

The most recently published Joint Electron Device Engineering Council (JEDEC) dual data rate (DDR) engineering technology, DDR5, defines two sub-channels per memory channel. Each sub-channel has a dedicated data bus that includes 32 bits of data and 8 bits of ECC and a dedicated command/address (C/A) channel (transactions directed to different addresses can be concurrently processed on different sub-channels of a same memory channel). FIG. 2 therefore can be considered to depict the module circuitry for one sub-channel. The module 200 of FIG. 2 can include another instance of the circuitry depicted in FIG. 2 so that both sub-channels of a same memory channel are coupled to the motherboard 201.

FIG. 3 depicts a DDR5 burst transfer for X4 memory chips. As observed in FIG. 3, data is transferred during the first sixteen cycles and cyclic redundancy check (CRC) information is transferred during the subsequent seventeenth and eighteenth cycles. DDR5 also specifies a similar transfer for X8 memory chips (eight data pins per memory chip) in which a first sixteen cycles are used to transfer data and a last seventeenth and eighteenth cycles are used to transfer CRC information.

During a write operation, the write data is received by the memory module's buffer chips 202 and routed to the memory chips of the rank targeted by the write transaction. Referring briefly back to FIG. 1, note the existence of CRC logic circuitry 104 within each of the memory chips. During the write transaction, the memory chips internally calculate CRC information from the received write data over the first sixteen cycles and then compare the internally calculated CRC information against the CRC information that is received during the seventeenth and eighteenth cycles. If there is a discrepancy, an error is reported back to the host. During a read operation, the memory chips calculate the CRC information from the read data and send the internally calculated CRC information at the end of the burst read transaction.

FIGURES

Figure 4:
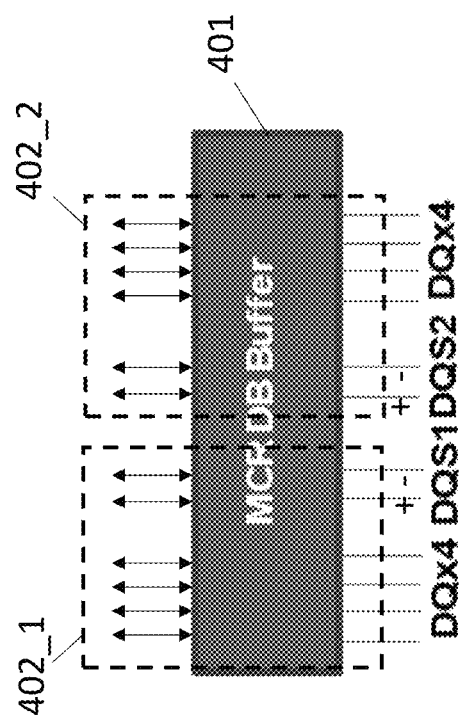
Figure 5:
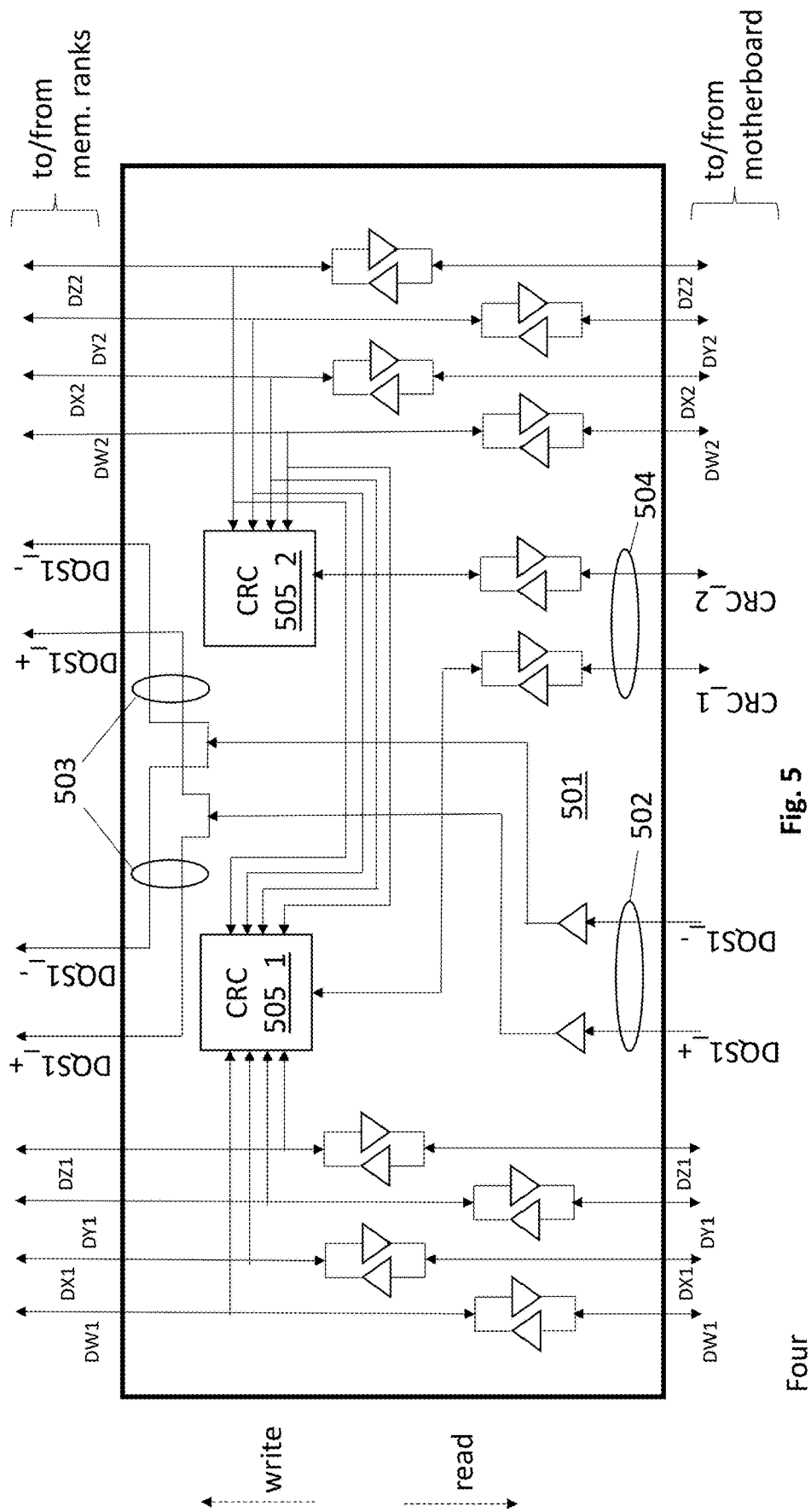
Figure 8:
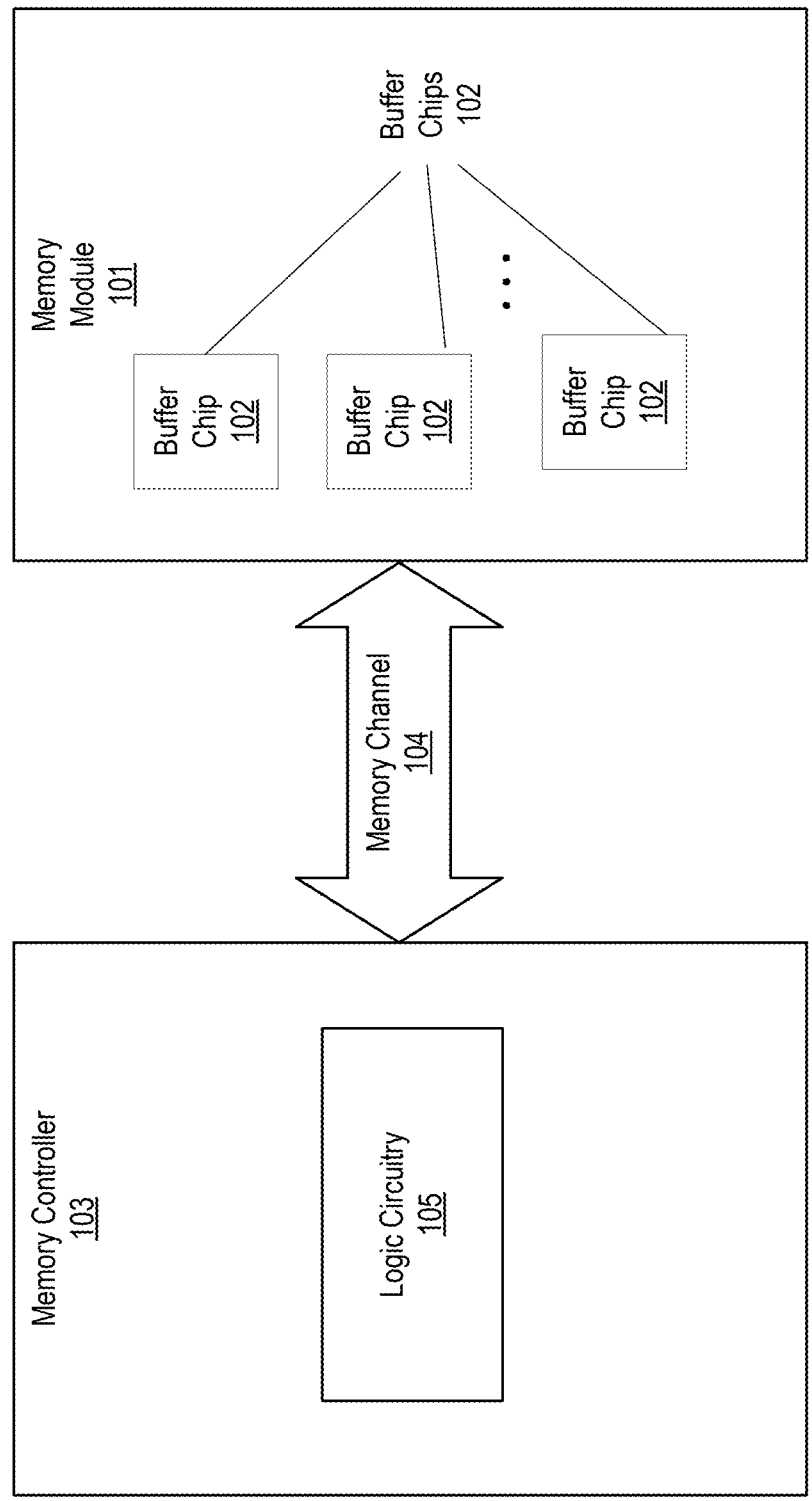
Figure 9:
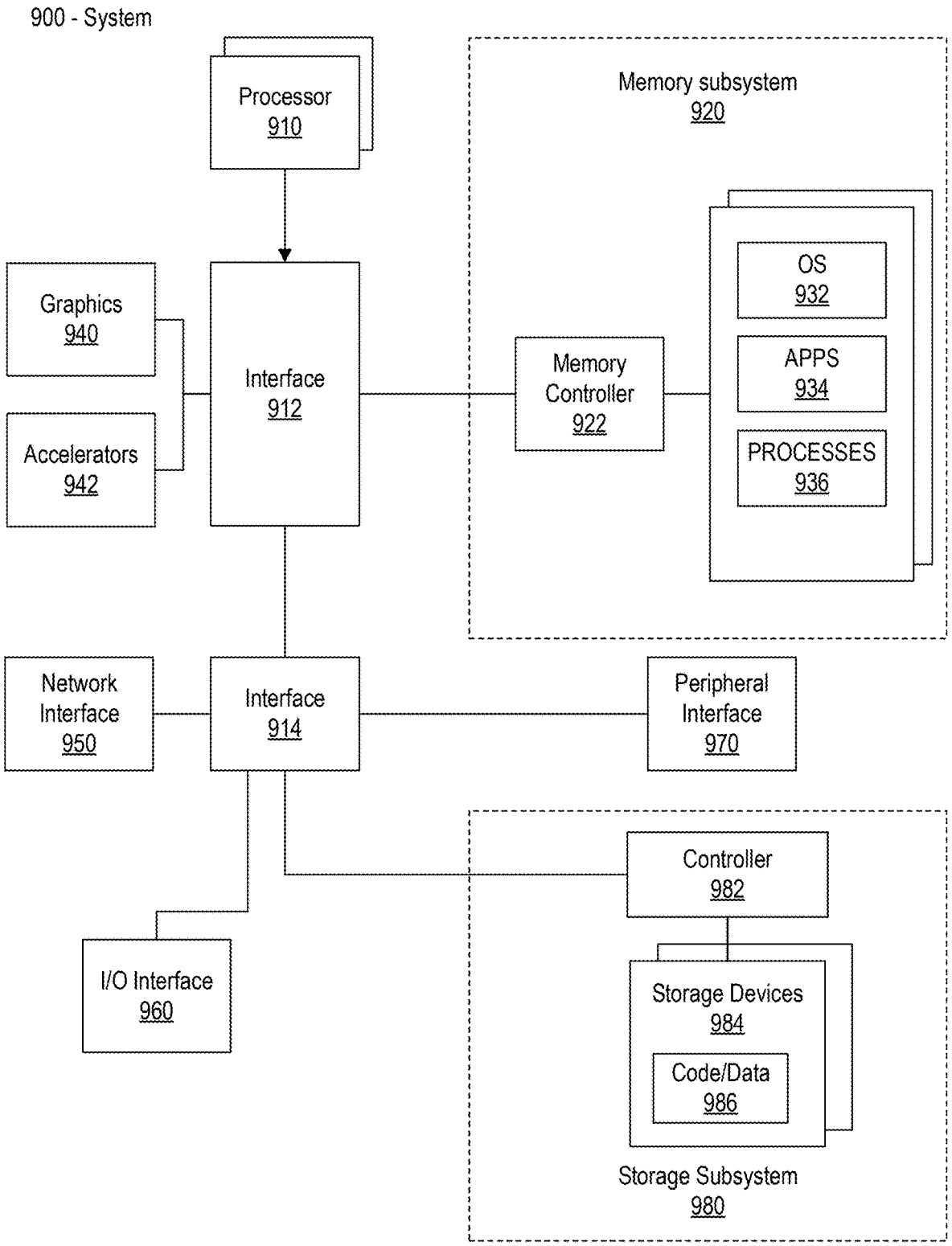
Figure 10:
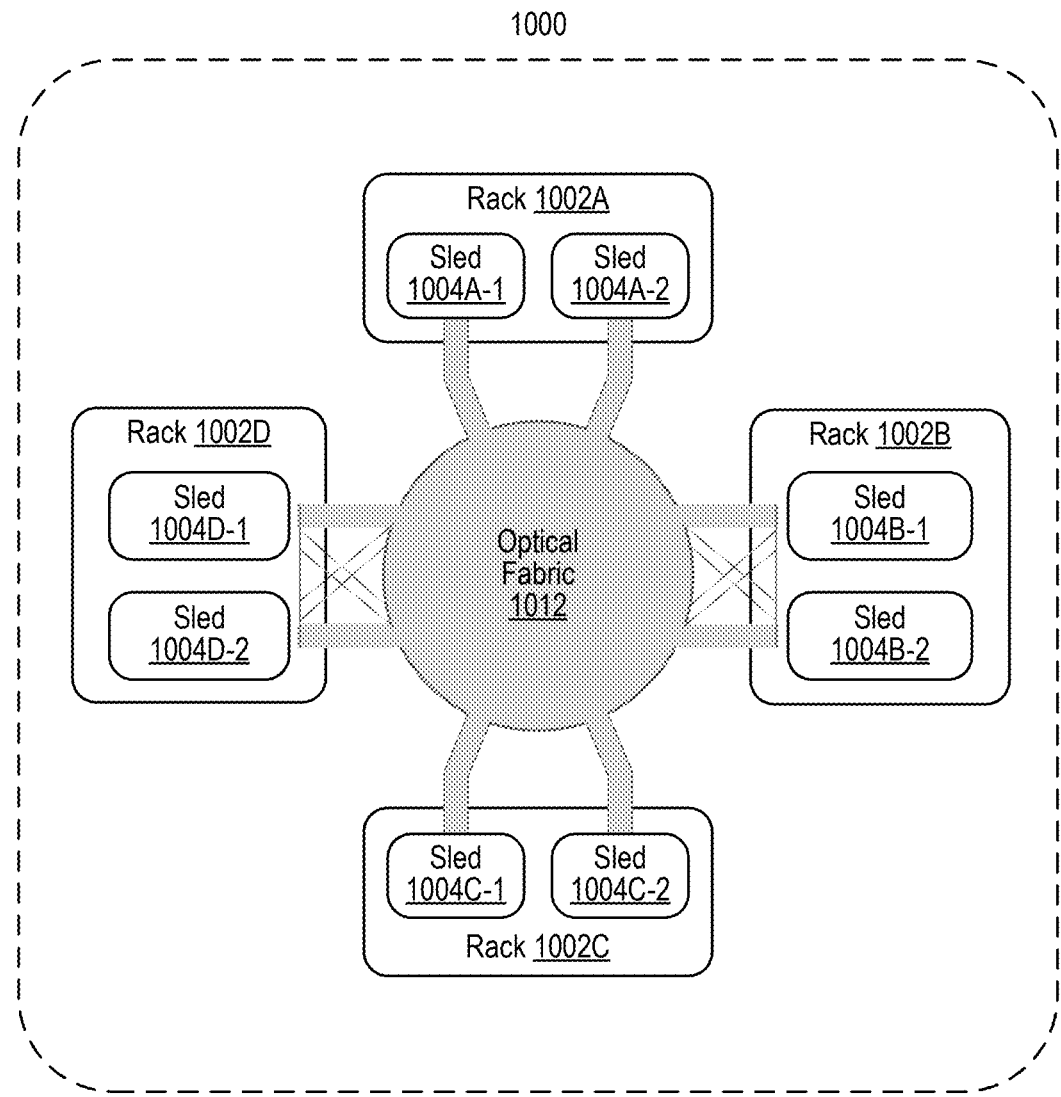
Figure 11:
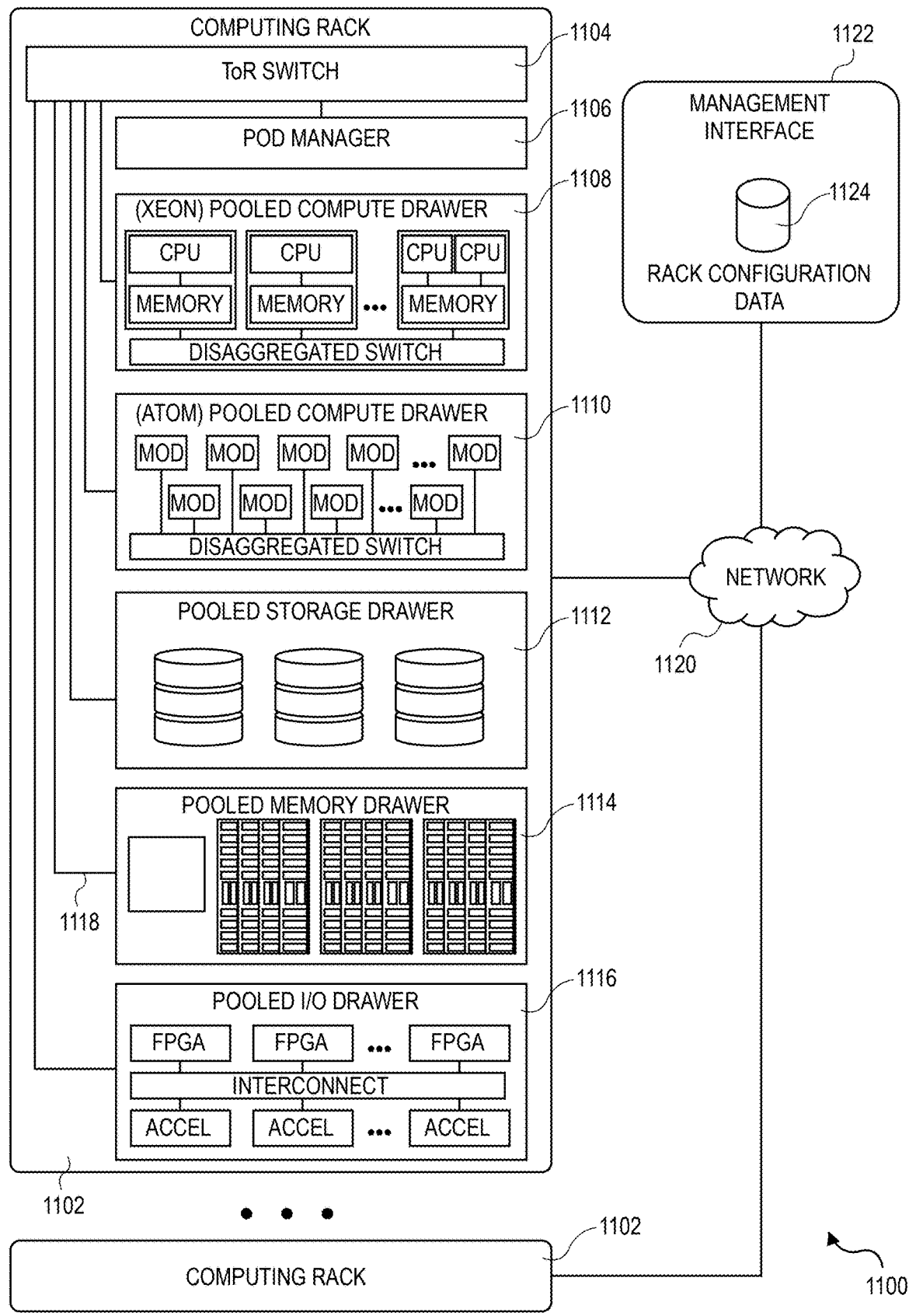

A better understanding of the present invention can be obtained from the following detailed description in conjunction with the following drawings, in which:

FIG. 1 shows a rank of memory chips (prior art);
FIG. 2 shows a memory module (prior art);
FIG. 3 shows a burst transfer sequence (prior art);
FIG. 4 shows a prior art buffer chip;
FIG. 5 shows an improved buffer chip;
FIG. 6 shows a first burst transfer sequence;
FIG. 7 shows a second burst transfer sequence;
FIG. 8 shows a memory controller coupled to a memory module;
FIG. 9 shows a system;
FIG. 10 shows a data center;
FIG. 11 shows a rack.

DETAILED DESCRIPTION

A problem with the DDR5 approach is the two extra cycles needed to transfer the CRC information during the transaction. If the CRC information could be transferred in parallel with the data, the seventeenth and eighteenth cycles would not be needed, which, in turn would correspond to an 11% speed improvement of the memory system (2/18=1/9=0.11). Unfortunately, memory modules are very constrained with respect to pinouts. That is, emerging memory technologies are continually seeking ways to implement memory modules in smaller and smaller form factors. Increasing a module's pinout has the undesired effect of increasing its size or otherwise making integration into a smaller form factor more difficult.

FIG. 4 shows a prior art buffer chip 401 that is suited for DDR5 implementations. As observed in FIG. 4, the buffer chip has two sets of pinouts 402_1, 402_2 to couple to the data and strobe wires for two X4 memory chips or one X8 memory chip. That is, the buffer chip 401 has pinouts for a first set 401_1 of X4 data and strobe signals, and, a second set 402_2 of X4 data and strobe signals. The buffer chip 401 receives and re-drives the signals for both sets 402_1, 402_2. In the case of a write, the buffer chip 401 receives the data and strobe signals for two X4 memory chips or one X8 memory chip from the motherboard and redrives them to the targeted rank.

FIG. 5 shows the design for an improved buffer chip 501 that allows for concurrent data and CRC transmission. As observed in FIG. 5, the improved buffer chip 501 is designed to redrive one of the received differential strobe input signals 502 as the strobe signal 503 for both sets of X4 signals. This frees two pinouts on the buffer's motherboard-side interface (as compared to the prior art buffer of FIG. 4) for repurposing as CRC pinouts 504. That is, comparing FIGS. 4 and 5, the pair of "DQS2" pins of FIG. 4 can be used instead for CRC_1 and CRC_2 pins of FIG. 5.

FIG. 6 shows an embodiment where, for each set of four data signals (DWx through DZx) sixteen cycles are available per burst transfer for CRC information. That is, for instance, sixteen cycles of CRC information can propagate through pin CRC_1 for data signals DW1 through DZ1, and, sixteen cycles of CRC information can propagate through pin CRC_2 for data signals DW2 through DZ2. As currently defined in the DDR5 specification (FIG. 3) there is 8 bits of CRC information transferred per burst over four data wires. As such, only eight of the cycles of FIG. 6 would be needed for the transfer of CRC information.

In an embodiment, the buffer chip 501 is designed to interface with a pair of X4 memory chips per rank or a single X8 memory chip per rank.

Thus, in a first configuration where the buffer chip interfaces with a pair of X4 memory chips per rank, DW1 through DZ1 correspond to the data signals for one X4 memory chip whereas DW2 through DZ2 correspond to the data signals for another X4 memory chip. CRC_1 propagates the CRC information for one set of data signals (DW1 through DZ1) whereas CRC_2 propagates the CRC information for the other set of data signals (DW2 through DZ2). The buffer chip includes CRC logic circuits 505_1 and 505_2.

When the buffer chip 501 is configured to interface with X4 memory chips, during a burst write, CRC_1 logic circuit 505_1 calculates CRC information from the DW1 through DZ1 data signals and compares it to the CRC information received at the CRC_1 pinout. Likewise, CRC_2 logic circuit 505_2 calculates CRC information from the DW2 through DZ2 data signals and compares it to the CRC information received at the CRC_2 pinout. Again, the CRC information is transferred while the data signals are being transferred. An error is reported if either of the internally calculated CRC values does not match its corresponding received CRC value. In an embodiment, the error is reported to a register clock driver (RCD) chip on the same memory module which then reports the error to the host.

During a burst read, the CRC_1 logic circuit calculates CRC information from the DW1 through DZ1 read data signals which is then transmitted from the CRC_1 pinout. Likewise, the CRC_2 logic circuit calculates CRC information from the DW2 through DZ2 read data signals which is then transmitted from the CRC_2 pinout. During a read the read data may be temporarily queued in registers within the buffer chip 501 (not shown in FIG. 5) to align the read data transmission with the CRC information transmission.

In an alternate embodiment, only one of the CRC pinouts CRC_1, CRC_2 is used to propagate CRC information. Here, a multiplexer (not shown in FIG. 5) resides between both CRC logic circuits 505_1, 505_2 and the one pinout that is used for CRC information (e.g., CRC_1). CRC information for both sets of data signals is propagated through the single CRC pinout but where the multiplexer selects the CRC information for one of the data signal sets (e.g., DW1 through DZ1) for one half (e.g., eight) of the burst's total cycles (e.g., sixteen) and selects the CRC information for the other of the data signal sets (e.g., DW2 through DZ2) for the other half of the burst's cycles.

In a second configuration the buffer chip interfaces with a single X8 memory chip per rank and both data sets (DW1 through DZ1), (DW2 through DZ2) corresponds to the eight bits that are transferred to/from the X8 memory chip. CRC information is still calculated separately for different sets of four data signals. As such, in an embodiment, the first logic circuit 505_1 processes the CRC information for the first set of four data signals (DW1 through DZ1) and the second logic circuit 505_2 processes the CRC information for the second set of data signals. In an embodiment, eight bits of CRC information exists per burst transfer per set of four data signals.

As such, the CRC information for both sets of four data signals can be multiplexed onto a single CRC pin (e.g., CRC_1) which will consume all sixteen cycles of the burst. FIG. 7 shows an exemplary burst transfer according to this configuration. Here, for instance, the CRC information for a particular set of four data signals can be transmitted during every other cycle of the burst. Alternatively, the CRC information for one of the sets can consume a first eight cycles whereas the CRC information for the other of the sets can consume a second eight cycles.

In this case, a pair of CRC logic circuits 505_1, 505_2 can be used (one for each set of four data signals), or, a single CRC logic circuit 5051 can be used that operates at twice the rate of the data signals (for this reason FIG. 7 shows CRC logic circuit 505_1 coupled to both sets of data signals). For ease of discussion the remainder of the discussion assumes both logic circuits 505-1, 505_2 are used.

During a write operation, the CRC logic circuits 505_1, 505_2 calculates CRC information from their respective set of four write data signals and compares it to the corresponding CRC information received at the CRC_1 pin. If there is a discrepancy an error is reported. During a read operation, the CRC logic circuits 505_1, 505_2 calculate CRC information from their respective set of four write data signals which is then transmitted from the CRC_1 pin.

The embodiment of FIG. 5 is able to interface with X4 memory chips or X8 memory chips (depending on how it is configured). Other embodiments may interface only with X4 memory chips or only with X8 memory chips consistent with the respective operations described above.

Buffer chips that interface with large memory chips (e.g., X16) can also implement the teachings above. For example, a single X4/X8/X16 buffer chip is implemented as a pair of circuits as observed in FIG. 5 instantiated next to one another. In an X4 configuration, the buffer chip interfaces with four X4 memory chips and four different CRC logic circuits process CRC information respectively for four respective sets of four data signals. In an X8 configuration the buffer chip interfaces with a pair of X8 memory chips and two different CRC logic circuits process CRC information respectively for two respective sets of eight data signals. In an X16 configuration the buffer chip interfaces with a single X16 memory chip and a single CRC logic circuit processes CRC information for the chip's sixteen data signals.

Although embodiments above have been directed toward a JEDEC DDR5 implementation, other implementations that conform to other designs (JEDEC or non JEDEC) can make use of buffer chips as described above.

As just one example, the buffer chip 500 of FIG. 5 can be designed to support burst transfers that multiplex transactions targeting different ranks between consecutive cycles of a same burst sequence. An example is described in U.S. Pub. App. No. 2019/0042500, assigned U.S. application Ser. No. 16/017,515, filed on Jun. 25, 2018 and entitle "DIMM FOR HIGH BANDWIDTH MEMORY CHANNEL" which is hereby incorporated by reference in its entirety. Here, CRC information could be calculated from the data of different transactions or a same transaction, depending on design implementation. In the case of the later (CRC information is calculated for a same transaction), the CRC logic circuits 5011, 505_2 could include state machines in order to, e.g., process separate sets of CRC information for the different data streams of the different transactions.

Although the term "pinout" has been used above to refer to the electrical connections of the buffer for the data signals and the CRC signals, more generally, such pinouts are understood to be input/output (I/Os).

The configuration of the buffer chip as described above is accomplished, in various embodiments, with configuration register circuitry ("register space") within the buffer chip.

The memory module that the buffer chip is implemented on can be any of a number of different memory modules such as a dual in-line memory module, a stacked memory chip module (e.g., JEDEC High Bandwidth Memory (HBM)), etc.

FIG. 8 shows a memory module 101 coupled to a memory controller 103 by way of a memory channel 104. The memory module 101 includes buffer chips 102 that operate according to any of the embodiments described above. As such, the memory controller includes logic circuitry 105 to calculate and send CRC information in parallel with write data over the memory channel 104 during a same write burst transfer sequence and receive and process CRC information that is received in parallel with read data from the memory channel 104 during a same read burst transfer sequence.

FIG. 9 depicts an example system. The system can use the teachings provided herein. System 900 includes processor 910, which provides processing, operation management, and execution of instructions for system 900. Processor 910 can include any type of microprocessor, central processing unit (CPU), graphics processing unit (GPU), processing core, or other processing hardware to provide processing for system 900, or a combination of processors. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 900 includes interface 912 coupled to processor 910, which can represent a higher speed interface or a high throughput interface for system components that needs higher bandwidth connections, such as memory subsystem 920 or graphics interface components 940, or accelerators 942. Interface 912 represents an interface circuit, which can be a standalone component or integrated onto a processor die. Where present, graphics interface 940 interfaces to graphics components for providing a visual display to a user of system 900. In one example, graphics interface 940 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 940 generates a display based on data stored in memory 930 or based on operations executed by processor 910 or both. In one example, graphics interface 940 generates a display based on data stored in memory 930 or based on operations executed by processor 910 or both.

Accelerators 942 can be a fixed function offload engine that can be accessed or used by a processor 910. For example, an accelerator among accelerators 942 can provide compression (DC) capability, cryptography services such as public key encryption (PKE), cipher, hash/authentication capabilities, decryption, or other capabilities or services. In some embodiments, in addition or alternatively, an accelerator among accelerators 942 provides field select controller capabilities as described herein. In some cases, accelerators 942 can be integrated into a CPU socket (e.g., a connector to a motherboard or circuit board that includes a CPU and provides an electrical interface with the CPU). For example, accelerators 942 can include a single or multi-core processor, graphics processing unit, logical execution unit single or multi-level cache, functional units usable to independently execute programs or threads, application specific integrated circuits (ASICs), neural network processors (NNPs), "X" processing units (XPUs), programmable control logic, and programmable processing elements such as field programmable gate arrays (FPGAs). Accelerators 942 can provide multiple neural networks, processor cores, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 920 represents the main memory of system 900 and provides storage for code to be executed by processor 910, or data values to be used in executing a routine. Memory subsystem 920 can include one or more memory devices 930 such as read-only memory (ROM), flash memory, volatile memory, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910. In some examples, a system on chip (SOC or SoC) combines into one SoC package one or more of: processors, graphics, memory, memory controller, and Input/Output (I/O) control logic.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

The memory 930 could include one or more memory chips designed to send a backpressure signal, and, the memory controller 922 could respond to the backpressure signal according to the teachings described at length above with respect to FIGS. 3 through 5.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect express (PCIe) bus, a HyperTransport or industry standard architecture (ISA) bus, a small computer system interface (SCSI) bus, Remote Direct Memory Access (RDMA), Internet Small Computer Systems Interface (iSCSI), NVM express (NVMe), Coherent Accelerator Interface (CXL), Coherent Accelerator Processor Interface (CAPI), a universal serial bus (USB), or an Institute of Electrical and Electronics Engineers (IEEE) standard 1394 bus.

In one example, system 900 includes interface 914, which can be coupled to interface 912. In one example, interface 914 represents an interface circuit, which can include stand-alone components and integrated circuitry. In one example, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can transmit data to a remote device, which can include sending data stored in memory. Network interface 950 can receive data from a remote device, which can include storing received data into memory. Various embodiments can be used in connection with network interface 950, processor 910, and memory subsystem 920.

In one example, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one example, system 900 includes storage subsystem 980 to store data in a nonvolatile manner. In one example, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage 984 holds code or instructions and data 986 in a persistent state (e.g., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (e.g., the value or state of the data is indeterminate if power is interrupted to system 900). In one example, storage subsystem 980 includes controller 982 to interface with storage 984. In one example controller 982 is a physical part of interface 914 or processor 910 or can include circuits or logic in both processor 910 and interface 914.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 900. More specifically, power source typically interfaces to one or multiple power supplies in system 1100 to provide power to the components of system 900. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 900 can be implemented as a disaggregated computing system. For example, the system 1100 can be implemented with interconnected compute sleds of processors, memories, storages, network interfaces, and other components. High speed interconnects can be used such as PCIe, Ethernet, or optical interconnects (or a combination thereof). For example, the sleds can be designed according to any specifications promulgated by the Open Compute Project (OCP) or other disaggregated computing effort, which strives to modularize main architectural computer components into rack-pluggable components (e.g., a rack pluggable processing component, a rack pluggable memory component, a rack pluggable storage component, a rack pluggable accelerator component, etc.).

FIG. 11 depicts an example of a data center. Various embodiments can be used in or with the data center of FIG. 11. As shown in FIG. 11, data center 1100 may include an optical fabric 1112. Optical fabric 1112 may generally include a combination of optical signaling media (such as optical cabling) and optical switching infrastructure via which any particular sled in data center 1100 can send signals to (and receive signals from) the other sleds in data center 1100. However, optical, wireless, and/or electrical signals can be transmitted using fabric 1112. The signaling connectivity that optical fabric 1112 provides to any given sled may include connectivity both to other sleds in a same rack and sleds in other racks. Data center 1100 includes four racks 1102A to 1102D and racks 1102A to 1102D house respective pairs of sleds 1104A-1 and 1104A-2, 1104B-1 and 1104B-2, 1104C-1 and 1104C-2, and 1104D-1 and 1104D-2. Thus, in this example, data center 1100 includes a total of eight sleds. Optical fabric 1112 can provide sled signaling connectivity with one or more of the seven other sleds. For example, via optical fabric 1112, sled 1104A-1 in rack 1102A may possess signaling connectivity with sled 1104A-2 in rack 1102A, as well as the six other sleds 1104B-1, 1104B-2, 1104C-1, 1104C-2, 1104D-1, and 1104D-2 that are distributed among the other racks 1102B, 1102C, and 1102D of data center 1100. The embodiments are not limited to this example. For example, fabric 1112 can provide optical and/or electrical signaling.

FIG. 12 depicts an environment 1200 includes multiple computing racks 1202, each including a Top of Rack (ToR) switch 1204, a pod manager 1206, and a plurality of pooled system drawers. Generally, the pooled system drawers may include pooled compute drawers and pooled storage drawers to, e.g., effect a disaggregated computing system. Optionally, the pooled system drawers may also include pooled memory drawers and pooled Input/Output (1/O) drawers. In the illustrated embodiment the pooled system drawers include an INTEL© XEON® pooled computer drawer 1208, and INTEL® ATOM™ pooled compute drawer 1210, a pooled storage drawer 1212, a pooled memory drawer 1214, and an pooled 1/O drawer 1216. Each of the pooled system drawers is connected to ToR switch 1204 via a high-speed link 1218, such as a 40 Gigabit/second (Gb/s) or 100 Gb/s Ethernet link or an 100+Gb/s Silicon Photonics (SiPh) optical link. In one embodiment high-speed link 1218 comprises an 1200 Gb/s SiPh optical link.

Again, the drawers can be designed according to any specifications promulgated by the Open Compute Project (OCP) or other disaggregated computing effort, which strives to modularize main architectural computer components into rack-pluggable components (e.g., a rack pluggable processing component, a rack pluggable memory component, a rack pluggable storage component, a rack pluggable accelerator component, etc.).

Multiple of the computing racks 1200 may be interconnected via their ToR switches 1204 (e.g., to a pod-level switch or data center switch), as illustrated by connections to a network 1220. In some embodiments, groups of computing racks 1202 are managed as separate pods via pod manager(s) 1206. In one embodiment, a single pod manager is used to manage all of the racks in the pod. Alternatively, distributed pod managers may be used for pod management operations.

RSD environment 1200 further includes a management interface 1222 that is used to manage various aspects of the RSD environment. This includes managing rack configuration, with corresponding parameters stored as rack configuration data 1224.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry."

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

An apparatus has been described. The apparatus includes a buffer semiconductor chip to be inserted between a memory channel and a plurality of memory chips. The buffer semiconductor chip includes a plurality of data signal input/output (I/Os) to respectively transport a plurality of data signals. The buffer semiconductor chip includes a cyclic redundancy check (CRC) I/O to transport CRC information for the plurality of data signals, the CRC information to be sent in parallel with the four data signals during a same burst transfer sequence. The buffer semiconductor chip includes CRC logic circuitry to generate the CRC information from the data signals if the burst transfer sequence is a read and receive the CRC information and compare the CRC information to second CRC information generated from the data signals if the burst transfer sequence is a write.

In an embodiment the buffer chip is to generate an alarm if the CRC information does not match the second CRC information. In an embodiment the plurality of memory chips are X4 memory chips. In an embodiment, the plurality of memory chips are X8 memory chips. In an embodiment the plurality of memory chips are X16 memory chips. In an embodiment the plurality of memory chips are one of at least X4 memory chips and X8 memory chips depending on the buffer chip's configuration.

In an embodiment the plurality of data signal I/Os include a first set of four I/Os and the plurality of data signals include a set of four data signals. In an extended embodiment the buffer chip further includes a set of four data signal I/Os to respectively transport a second set of four data signals, a second cyclic redundancy check (CRC) I/O to transport third CRC information for the second set of data signals, the third CRC information to be sent in parallel with the second set of four data signals during the burst transfer sequence; and, second CRC logic circuitry to generate the third CRC information from the second set of data signals if the burst transfer sequence is a read and receive the third CRC information and compare the third CRC information to fourth CRC information generated from the second set of data signals if the burst transfer sequence is a write.

A computing system has been described. The computing system includes a plurality of processing cores, a network interface, a memory controller coupled between the plurality of processing cores and a memory module. The memory module includes a buffer semiconductor chip to be inserted between a memory channel and a plurality of memory chips. The buffer semiconductor chip is as described just above. The buffer chip can further include any the embodiments described just above.

A method has been described. The method includes a buffer semiconductor chip receiving a plurality of data signals. The method includes the buffer chip calculating first CRC information from the plurality of data signals. The method includes the buffer chip transmitting the plurality of data signals in parallel with the first CRC information if a read burst transfer sequence is being performed, the method includes the buffer chip receiving second CRC information in parallel with the plurality of data signals and comparing the first CRC information with the second CRC information if a write burst transfer sequence is being performed.

In an embodiment the buffer semiconductor chip receives the plurality of data signals from X4 memory chips during the read burst transfer sequence. In an embodiment the buffer semiconductor chip is disposed on a dual in-line memory module. In an embodiment the buffer chip is disposed on a stacked memory chip module.

The invention claimed is:

1. An apparatus, comprising:
a buffer semiconductor chip to be inserted between a memory channel disposed on a motherboard and a plurality of memory chips, the buffer semiconductor chip comprising:
a plurality of data strobe pins to propagate differential data strobe signal input/output (I/Os) to transport a plurality of data signals to corresponding data pins on the plurality of memory chips;
drive circuitry to redrive a received one of the differential data strobe signal I/Os to transport the plurality of data signals on a first data strobe pin of the plurality of data strobe pins to at least two sets of corresponding data pins on the plurality of memory chips;
a second data strobe pin of the plurality of data strobe pins repurposed to propagate a cyclic redundancy check (CRC) I/O to transport CRC information for the plurality of data signals, the CRC information to be transported on the second data strobe pin in parallel with the plurality of data signals transported on the first data strobe pin during a same burst transfer sequence; and
CRC logic circuitry to:
generate the CRC information from the plurality of data signals if the burst transfer sequence is a read, and
receive the CRC information and compare the CRC information to second CRC information generated from the plurality of data signals if the burst transfer sequence is a write.

2. The apparatus of claim 1 wherein the buffer semiconductor chip is to generate an alarm if the CRC information does not match the second CRC information.

3. The apparatus of claim 1 wherein the plurality of memory chips are X4 memory chips.

4. The apparatus of claim 1 wherein the plurality of memory chips are X8 memory chips.

5. The apparatus of claim 1 wherein the plurality of memory chips are X16 memory chips.

6. The apparatus of claim 1 wherein the plurality of memory chips are one of at least X4 memory chips and X8 memory chips depending on a configuration of an interface of the buffer semiconductor chip with the plurality of memory chips.

7. The apparatus of claim 1 wherein the plurality of data signal I/Os comprises a first set of four I/Os and the plurality of data signals comprises a set of four data signals.

8. A computing system, comprising:
a plurality of processing cores;
a network interface;
a memory controller coupled between the plurality of processing cores and a memory module, the memory module comprising a buffer semiconductor chip to be inserted between a memory channel disposed on a motherboard and a plurality of memory chips, the buffer semiconductor chip comprising:
a plurality of data strobe pins to propagate differential data strobe signal input/output (I/Os) to transport a plurality of data signals to corresponding data pins on the plurality of memory chips;
drive circuitry to redrive a received one of the differential data strobe signal I/Os to transport the plurality of data signals on a first data strobe pin of the plurality of data strobe pins to at least two sets of corresponding data pins on the plurality of memory chips;
a second data strobe pin of the plurality of data strobe pins repurposed to propagate a cyclic redundancy check (CRC) I/O to transport CRC information for the plurality of data signals, the CRC information to be transported on the second data strobe pin in parallel with the plurality of data signals transported on the first data strobe pin during a same burst transfer sequence; and
CRC logic circuitry to:
generate the CRC information from the plurality of data signals if the burst transfer sequence is a read, and
receive the CRC information and compare the CRC information to second CRC information generated from the plurality of data signals if the burst transfer sequence is a write.

9. The computing system of claim 8 wherein the buffer semiconductor chip is to generate an alarm if the CRC information does not match the second CRC information.

10. The computing system of claim 8 wherein the plurality of memory chips are X4 memory chips.

11. The computing system of claim 8 wherein the plurality of memory chips are X8 memory chips.

12. The computing system of claim 8 wherein the plurality of memory chips are X16 memory chips.

13. The computing system of claim 8 wherein the plurality of memory chips are one of at least X4 memory chips and X8 memory chips depending on a configuration of an interface of the buffer semiconductor chip with the plurality of memory chips.

14. The computing system of claim 8 wherein the plurality of data signal I/Os comprises a first set of four I/Os and the plurality of data signals comprises a set of four data signals.

15. A method, comprising:
a buffer semiconductor chip receiving a plurality of data signals;
the buffer semiconductor chip calculating first cyclic redundancy check (CRC) information from the plurality of data signals;
the buffer semiconductor chip redriving a received differential data strobe signal input/output (I/Os) on a first data strobe pin to transmit the plurality of data signals to at least two sets of corresponding data pins on memory chips;
the buffer semiconductor chip to repurpose a second data strobe pin to propagate a cyclic redundancy check (CRC) I/O for the plurality of data signals, the buffer semiconductor chip to transmit a first CRC information on the second data strobe pin in parallel with the plurality of data signals transmitted by the first data strobe pin during a same burst transfer sequence if a read burst transfer sequence is being performed; and
the buffer semiconductor chip receiving on the second data strobe pin repurposed to propagate the CRC I/O a second CRC information in parallel with the plurality of data signals received on the first data strobe pin as a redriven differential data strobe signal I/O during the same burst transfer sequence, and comparing the first CRC information with the second CRC information if a write burst transfer sequence is being performed.

16. The method of claim 15 wherein the buffer semiconductor chip receives the plurality of data signals from X4 memory chips during the read burst transfer sequence.

17. The method of claim 15 wherein the buffer semiconductor chip is disposed on a dual in-line memory module.

18. The method of claim 15 wherein the buffer semiconductor chip is disposed on a stacked memory chip module.

* * * * *